United States Patent [19]

Ladin

[11] 4,219,246
[45] Aug. 26, 1980

[54] STAKED FLANGE CLUTCH RELEASE BEARING ASSEMBLY

[75] Inventor: Eli M. Ladin, Ann Arbor, Mich.

[73] Assignee: Federal-Mogul Corporation, Southfield, Mich.

[21] Appl. No.: 39,089

[22] Filed: May 14, 1979

[51] Int. Cl.³ .............................................. F16C 19/10
[52] U.S. Cl. ...................................... 308/219; 308/233; 192/98
[58] Field of Search ............... 308/219, 233, 232, 234, 308/230, 229; 192/98 R

[56] References Cited

U.S. PATENT DOCUMENTS

| | | | |
|---|---|---|---|
| 3,277,988 | 10/1966 | Pitner | 308/233 |
| 3,286,802 | 11/1966 | Fädler et al. | 308/233 |
| 3,909,086 | 9/1975 | Keleshian | 308/233 |
| 4,166,659 | 9/1979 | Gleichman | 308/219 |

Primary Examiner—Lenard A. Footland

[57] ABSTRACT

A composite clutch release bearing assembly including a tubular bearing carrier having an annular collar disposed in frictional engagement on one end thereof and interlocked to prevent relative rotation and outward axial movement of the collar relative to the carrier. A thrust-type bearing is disposed with its stationary race member in frictional engagement on the other end of said tubular carrier preventing axial outward movement of the bearing along the other end of said carrier. The bearing is positioned with the inner face of the stationary race in abutting relationship against the inner edge of the collar and the collar is further provided with a radially extending flange including engaging means for coacting with the clutch actuation mechanism.

13 Claims, 4 Drawing Figures

STAKED FLANGE CLUTCH RELEASE BEARING ASSEMBLY

BACKGROUND OF THE INVENTION

A variety of clutch release or throw-out bearing assemblies have heretofore been used or proposed for use for the actuation of a clutch in the drive train of vehicles equipped with manual transmissions. The relative severity of the operating conditions to which such clutch release bearings are subjected has prompted continuing development work to improve their durability and quiet operating performance over an increased operating life. The relatively abrupt loading and rotational forces to which such clutch release bearing assemblies are subjected during the actuation and release of the clutch assembly coupled with the marginal lubrication and vibration to which they are subjected has prompted the use of constructions which are of relatively high weight and of difficult and costly manufacture.

The present invention provides for an improved clutch release bearing assembly construction employing a composite bearing carrier which can readily be fabricated from stamped components and assembled to provide a properly aligned and dimensionally accurate assembly which is of durable operation, economical manufacture and of versatile use.

SUMMARY OF THE INVENTION

The benefits and advantages of the present invention are achieved by a clutch release bearing assembly comprising a composite bearing carrier comprised of a tubular member on which an annular collar is disposed in frictional engagement around one end portion thereof and wherein interlocking means are provided on the collar and carrier to prevent relative rotation therebetween and relative outward axial movement of the collar along the end portion of the tubular member. The collar is formed with a flange or plate extending radially therefrom and axially spaced outwardly of an inner annular edge of the collar. A bearing of the thrust-type is frictionally mounted around the other end portion of the tubular member with the inner face of the race member disposed in abutting relationship against the inner edge of the collar to maintain appropriate spaced relationship between the bearing and flange. In accordance with a preferred embodiment, the outer face of the stationary race member intersects the bore thereof in the form of a sharp annular edge which is adapted to engage the periphery of the tubular member to prevent outward axial movement of the bearing along the other end of the tubular member. Suitable engaging means such as spring clips can be incorporated on the flange or plate for coacting with the clutch actuation mechanism such as the actuating fork to assist in the axial shifting movement of the bearing along a tube or rod mounted coaxially with the clutch actuation fingers.

In accordance with a preferred embodiment of the present invention, the tubular member is formed with a plurality of indentations along the inner surface thereof which are adapted to receive and retain a lubricant to facilitate axial shifting movement of the clutch release bearing assembly during each clutch operating cycle. Additionally, the tubular member or carrier is preferably made from a rolled sheet metal blank in which the longitudinal edges thereof are disposed in abutting relationship and suitable interlocking tabs or clinch butt tabs are provided for retaining the edges in appropriate abutting relationship.

Additional benefits and advantages of the present invention will become apparent upon a reading of the description of the preferred embodiments taken in conjunction with the accompanying drawings.

DESCRIPTION OF THE PREFERRED EMBODIMENTS

Figure 1:
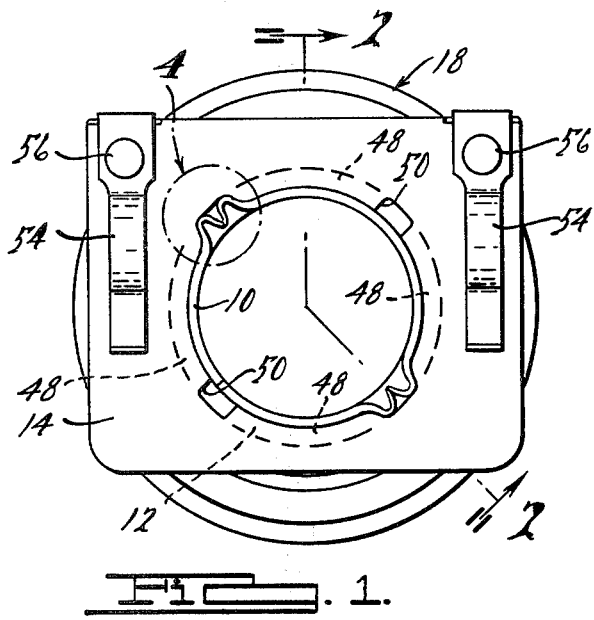
FIG. 1 is an end elevational view of a clutch release bearing constructed in accordance with the preferred embodiments of the present invention.
Figure 2:
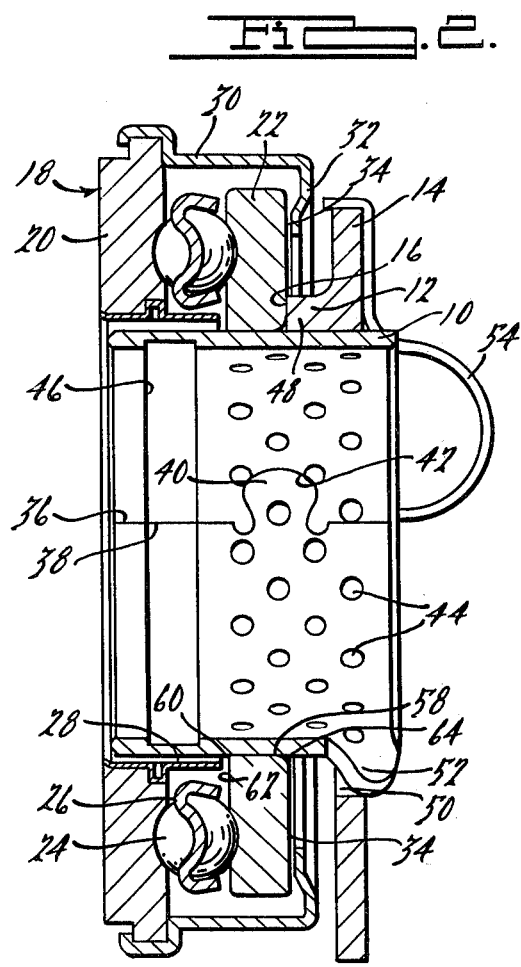
FIG. 2 is a magnified sectional view through the clutch release bearing shown in FIG. 1 and taken substantially along the line 2—2 thereof.

Referring now in detail to the drawings and as may be best seen in FIGS. 1 and 2, a clutch release bearing assembly constructed in accordance with the preferred embodiments of the present invention comprises a tubular member or bearing carrier 10 to the rearward or right hand end as viewed in FIG. 2, an annular collar 12 is disposed in frictional engagement around the periphery thereof. The annular collar 12 includes an integrally formed radially extending plate or flange 14. The inner or left hand end of the collar 12 as viewed in FIG. 2 is formed with an annular radially extending edge 16 which is axially spaced from the face of the plate 14. A thrust-type bearing 18 including a rotatable race 20 and a stationary race 22 are formed with opposed annular raceways in which a plurality of anti-friction elements such as balls 24 are constrained. The balls 24 are maintained in appropriate circumferentially spaced relationship by means of a retainer 26. A tubular grease retainer 28 is affixed to the inner bore of the rotatable race and extends axially therefrom toward the inner face of the stationary race 22. An annular sheet metal housing 30 is affixed to the periphery of the rotatable race and extends axially therefrom around the stationary race and is formed with an inwardly directed radially flange 32 which overlies an inner face 34 of the stationary race in a manner so as to retain the race members in appropriate assembled relationship with the balls 24 constrained therebetween. The housing 30 in combination with the grease retainer 28 also serves to retain a lubricant within the bearing in an area adjacent to the annular raceways and balls.

The tubular bearing carrier 10 is preferably formed from a rolled sheet metal stock such that the longitudinal edges 36, 38 as best seen in FIG. 2 are disposed in abutting relationship. Suitable interlocking means such as a tab 40 formed along the longitudinal edge 36 and a correspondingly contoured recess 42 formed along the longitudinal edge 38 are provided to form a so-called clinch butt connection to maintain the edges in appropriate abutting relationship. The inner surface of the tubular carrier 10, as best seen in FIG. 2 is preferably provided with a plurality of dimpled recesses indicated at 44 as well as an annular groove 46 which are adapted to receive and retain an appropriate lubricant such as grease to facilitate axial reciprocating movement of the tubular carrier along a tube or shaft on which the clutch release bearing is mounted when assembled in a vehicle drive train. The tubular carrier may also be provided with an appropriate lining around the inner surface thereof to further improve its anti-frictional characteristics.

Figure 3:
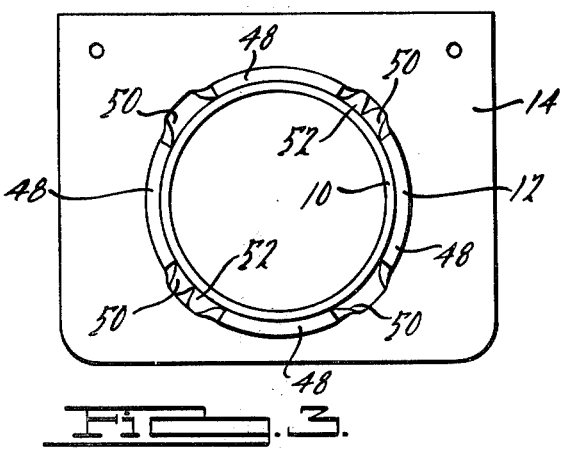
FIG. 3 is a front elevational view of the composite bearing carrier with the bearing removed therefrom.
Figure 4:
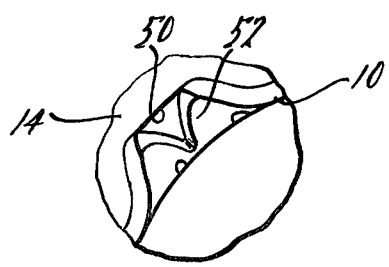
FIG. 4 is a magnified fragmentary view of the interlocking means between the tubular member and flange shown in FIG. 1 within the encircled area indicated at 4.

In accordance with a preferred embodiment, the annular collar 12 is integrally formed with the flange 14 as best seen in FIGS. 1–3 and can readily be fabricated employing conventional blanking, stamping and forming practices. The collar 12 is in the form of a plurality of individual arcuate segments 48 which are separated by circumferentially spaced openings 50 which serve the dual function of facilitating the formation of the arcuate segments and also provide recesses for interlockingly receiving outward radially deformed sections 52 of the tubular carrier. The radially deformed sections 52 along the rearward edge of the tubular carrier are formed by a staking operation after the collar and flange are assembled around the end portion of the tubular carrier employing a friction fit therebetween. The outward radial deformation of diametrically opposite portions of the edge of the tubular carrier causes coacting engagement of such deformed sections within the openings 50 of the flange serving to interlock the two components thereby preventing relative rotation and outward axial movement of the collar and flange along the rearward end of the tubular carrier.

As best seen in FIGS. 1 and 2, the flange 14 is also provided with a pair of transversely spaced spring clips 54 secured such as by means of rivets 56 which are adapted to engage the operating ends of an actuating fork in a well known manner for effecting reciprocating movement of the clutch release bearing assembly.

The stationary race 22 is formed with a internal bore 58 which is adapted to be press fit and disposed in frictional engagement around the periphery of the tubular carrier along the other end portion thereof opposite to said collar. The inner face 34 of the stationary race is disposed in abutting relationship against the annular radial edge 16 of the collar 12 thereby appropriately positioning the bearing in proper axial spaced relationship from the flange 14. This axial spacing is controlled by the axial length or offset of the annular collar 12 or arcuate segments 48 relative to the plane of the flange 14.

The retention of the bearing 18 with the inner face 34 of its stationary race in abutting relationship against the annular edge of the collar and against outward axial movement of the bearing along the tubular carrier is achieved by suitable interlocking or frictional engagement between the bore of the stationary race and the periphery of the carrier. Suitable staking of the stationary race after assembly on the carrier by indentations formed around the periphery of the tubular carrier adjacent to the outer face 62 of the stationary race is suitable. Preferably, the stationary race is installed as a press-fit providing frictional engagement with the periphery of the carrier and further interlocking engagement can be achieved, in accordance with a preferred embodiment, by forming a sharp annular edge indicated at 60 in FIG. 2 by the intersection of the bore 58 with an outer face 62 of the stationary race member. The sharp annular edge 60 engages the periphery of the tubular carrier and resists outward axial movement of the bearing along the left end portion of the carrier as viewed in FIG. 2. The internal bore 58 intersects the inner face 34 of the stationary race member in the form of a somewhat rounded or chamfered annular edge 64 which facilitates the operation of press fitting the bearing over the end portion of the tubular carrier during the assembly operation. The composite bearing carrier and thrust bearing components can be assembled in one step employing a suitable fixture in which the preassembled bearing, tubular bearing carrier and composite collar and flange are arranged in stacked relationship. The tubular bearing carrier is pressed through the collar and internal bore of the bearing whereafter the end edges of the tubular carrier are staked to form the interlocking radially deformed sections which in combination with the sharp annular edge on the stationary race serves to retain the three components in appropriate axially and angularly aligned relationship. When a tubular bearing carrier of the clinch butt type is employed, the longitudinal seam defined by the opposed longitudinal edges 36, 38 are positioned at a circumferential position angularly offset from the position at which the carrier is staked to form the deformed sections 52.

It will be appreciated that the thrust bearing 18 may also be of the angular contact type as well as of the axial thrust type as specifically shown in the drawing.

While it will be apparent that the invention herein disclosed is well calculated to achieve the benefits and advantages as hereinabove set forth, it will be appreciated that the invention is susceptible to modification, variation and change without departing from the spirit thereof.

What is claimed is:

1. A clutch release bearing assembly comprising a tubular bearing carrier, an annular collar disposed in frictional engagement around one end portion of said carrier and terminating in an annular radial edge and formed with a radially extending flange axially spaced from said edge, interlocking means on said collar and said carrier for preventing relative rotation therebetween and outward axial movement of said collar along said one end portion, a bearing supported by said carrier including a rotatable race, a stationary race and a plurality of antifriction elements constrained therebetween, said stationary race having an inner radial face and an axially spaced outer radial face and formed with an axial bore disposed in frictional engagement around the other end portion of said carrier, said stationary race positioned with said inner face in axial abutting relationship against said radial edge of said collar.

2. The bearing assembly as defined in claim 1 in which said collar is integrally formed with said radially extending flange.

3. The bearing assembly as defined in claim 1 in which said collar comprises a plurality of circumferentially spaced arcuate segments supported by said flange.

4. The bearing assembly as defined in claim 1 in which said interlocking means comprises a radially offset section on said one end portion of said collar disposed in engaging relationship within a circumferential gap formed in said collar.

5. The bearing assembly as defined in claim 1 including two diametrically disposed offset sections disposed in engaging relationship within two diametrically disposed circumferential gaps in said collar.

6. The bearing assembly as defined in claim 1 in which said inner radial face of said stationary race intersects said bore in the form of a rounded annular edge.

7. The bearing assembly as defined in claim 1 wherein said carrier is comprised of a rolled metal sheet having the longitudinal edges thereof disposed in abutting relationship and means along said longitudinal edges for interlockingly engaging and retaining said edges in abutting relationship.

8. The bearing assembly as defined in claim 1 in which the internal surface of said tubular bearing carrier is formed with at least one cavity adapted to receive and retain a lubricant therein.

9. The bearing assembly as defined in claim 1 further including engaging means on said flange for releasably engaging actuating means for effecting axial movement of said bearing assembly.

10. The bearing assembly as defined in claim 1 in which said bearing is of the axial thrust type.

11. The bearing assembly as defined in claim 1 in which said frictional engagement of said stationary race on said carrier is achieved by a press fit.

12. The bearing assembly as defined in claim 1 in which said frictional engagement of said stationary race on said carrier is achieved by staking the periphery of said carrier adjacent to said stationary race.

13. The bearing assembly as defined in claim 1 in which said outer radial face intersects said bore of said stationary race in the form of a sharp annular edge, and said frictional engagement of said stationary race on said carrier is achieved by a press fit with said annular edge disposed in engaging relationship with the periphery of said carrier to prevent outward axial movement of said bearing along said other end portion.

* * * * *